(12) United States Patent
Patel et al.

(10) Patent No.: US 12,126,532 B1
(45) Date of Patent: Oct. 22, 2024

(54) USING ARP TO IDENTIFY LOCALLY ATTACHED SOURCE

(71) Applicant: Arista Networks, Inc., Santa Clara, CA (US)

(72) Inventors: Swati Patel, Fremont, CA (US); Bharathram Pattabhiraman, San Jose, CA (US); Sandeep Betha, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/352,861

(22) Filed: Jul. 14, 2023

(51) Int. Cl.
| | | |
|---|---|---|
| G06F 15/16 | (2006.01) | |
| H04L 45/02 | (2022.01) | |
| H04L 45/24 | (2022.01) | |
| H04L 45/74 | (2022.01) | |
| H04L 61/103 | (2022.01) | |

(52) U.S. Cl.
CPC ............. H04L 45/74 (2013.01); H04L 45/02 (2013.01); H04L 45/24 (2013.01); H04L 61/103 (2013.01)

(58) Field of Classification Search
CPC ......... H04L 45/74; H04L 45/02; H04L 45/24; H04L 61/103
USPC .......................................................... 709/238
See application file for complete search history.

(56) References Cited

U.S. PATENT DOCUMENTS

| | | | | |
|---|---|---|---|---|
| 6,711,163 B1* | 3/2004 | Reid | .................... | H04L 12/1836 370/432 |
| 7,012,931 B2* | 3/2006 | Higuchi | .................. | H04L 69/16 370/467 |
| 7,349,348 B1* | 3/2008 | Johnson | .................. | H04L 45/00 370/254 |
| 7,924,837 B1* | 4/2011 | Shabtay | ............... | H04L 12/4641 370/465 |
| 7,983,261 B1* | 7/2011 | Aggarwal | ............... | H04L 12/18 370/395.5 |
| 8,259,612 B2* | 9/2012 | Cai | .......................... | H04L 45/16 370/254 |
| 8,611,252 B2* | 12/2013 | Cai | ......................... | H04L 45/54 370/254 |
| 8,934,486 B2* | 1/2015 | Wijnands | ................ | H04L 45/50 370/432 |
| 9,059,943 B2* | 6/2015 | Cai | ....................... | H04L 12/4641 |
| 9,281,951 B2* | 3/2016 | Asati | ....................... | H04L 12/18 |
| 9,338,079 B2* | 5/2016 | Cai | ..................... | H04L 12/4641 |
| 9,641,352 B2* | 5/2017 | Song | .................. | H04L 12/4641 |
| 10,117,206 B2* | 10/2018 | Zhu | ......................... | H04W 4/80 |
| 10,313,216 B2* | 6/2019 | Zheng | ..................... | H04L 43/08 |
| 10,425,325 B2* | 9/2019 | Vattem | .................... | H04L 45/16 |
| 10,461,998 B2* | 10/2019 | Li | ......................... | H04L 12/1886 |
| 11,165,746 B2* | 11/2021 | Lo | ........................ | H04L 61/5007 |
| 11,245,664 B2* | 2/2022 | Pathikonda | ......... | H04L 61/2503 |

(Continued)

*Primary Examiner* — Alicia Baturay
(74) *Attorney, Agent, or Firm* — Fountainhead Law Group, PC

(57) ABSTRACT

The present disclosure describes using Address Resolution Protocol (ARP) to determine whether a host is behind a PE or not behind a PE. In a use case, for example, advertising a Selective Provider Multicast Service Interface Auto-Discovery (S-PMSI-AD) route to advertise encapsulation of a multicast group is triggered by receiving multicast traffic for that group from a host device behind the provider edge (PE) device. Multicast traffic received from behind remote PEs will not trigger a S-PMSI-AD route.

20 Claims, 8 Drawing Sheets

(56) References Cited

U.S. PATENT DOCUMENTS

| | | | |
|---|---|---|---|
| 11,323,279 B1* | 5/2022 | N ........................... | H04L 12/185 |
| 11,381,500 B2* | 7/2022 | Kanjariya ............ | H04L 12/4633 |
| 11,502,865 B2* | 11/2022 | Immidi ................ | H04L 12/1886 |
| 11,528,157 B1* | 12/2022 | Patel ................... | H04L 12/1886 |
| 11,711,230 B2* | 7/2023 | Nandy ................. | H04L 12/185 |
| | | | 370/390 |
| 11,784,922 B2* | 10/2023 | Karunakaran ........ | H04L 47/806 |
| | | | 709/238 |
| 11,799,769 B2* | 10/2023 | Xie ........................ | H04L 45/42 |
| 11,870,605 B2* | 1/2024 | Nalagatla ............. | H04L 12/185 |
| 2012/0177054 A1* | 7/2012 | Pati ..................... | H04L 12/4625 |
| | | | 370/395.53 |
| 2014/0258485 A1* | 9/2014 | Yang .................... | H04L 41/122 |
| | | | 709/223 |
| 2022/0200814 A1* | 6/2022 | Mishra .................. | H04L 45/50 |
| 2022/0200820 A1* | 6/2022 | Xie ..................... | H04L 12/4633 |
| 2022/0217075 A1* | 7/2022 | Xie ..................... | H04L 12/4633 |
| 2023/0318974 A1* | 10/2023 | Xie ...................... | H04L 45/741 |
| | | | 370/392 |

* cited by examiner

USING ARP TO IDENTIFY LOCALLY ATTACHED SOURCE

CROSS REFERENCE TO RELATED APPLICATIONS

This application is related to concurrently filed U.S. Pat. No. 18,352,857, entitled "Multicasting Using Selective Advertisement of EVPN Routes," filed Jul. 14, 2023, the content of which is incorporated herein by reference in its entirety for all purposes.

BACKGROUND

The present disclosure is generally directed to multicast in an Ethernet virtual private network (EVPN) deployment. Host machines in the EVPN can send multicast packets (also referred to as overlay multicast) to multicast groups stretched across multiple provider edge devices (PEs) in the EVPN. Overlay multicast packets received by a PE are encapsulated and transmitted in underlay multicast packets by the PE to other PEs connected to the core network of the EVPN. EVPN routes are advertised between the PEs to support the transmission of these multicast packets in the EVPN.

The activity associated with advertising EVPN routes consumes resources across the network, including at the sending PE, the receiving PE(s), and in the core network itself. For instance, computing resources in the sending PE are consumed to generate and advertise an EVPN route. Each receiving PE uses computing bandwidth to process a received EVPN route and in some situations may consume hardware resources (e.g., programming of entries in hardware tables) to store information generated by the received route. The transmission of advertised EVPN routes consumes computing and data bandwidth in the core network.

A PE can advertise routes for every overlay multicast group that it knows about irrespective of whether there is a source of multicast traffic for the multicast group. For example, PEs may know about overlay multicast groups because (1) they have receivers for that group somewhere in the network, or (2) they may know about overlay multicast groups because they are receiving traffic for that group from sources behind receiver PEs, or (3) they may know about overlay multicast groups because of configuration from the customer. As such, a PE can advertise routes for multicast groups for which the PE will never send traffic to the core network. Advertising such routes will create unnecessary burden on the underlay network. There is the burden of transmitting, updating, and storing these routes. Additionally, multicast trees/tunnels that are setup as a result of these routes but never used in the underlay network consume hardware resources.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In accordance with the present, a PE can selectively advertise an EVPN route (e.g., Selective Provider Multicast Service Interface Auto-Discovery, S-PMSI-AD, route) for a multicast group in response to traffic (data packets) being sent to that multicast group that originates from a source (e.g., host) behind the PE. In some embodiments, the PE can use address resolution protocol (ARP) to determine whether a host machine is behind (or directly connected to) a PE. The PE can transmit an ARP request with the internet protocol (IP) address of the host machine. The ARP response can create a binding in the PE that maps the IP address of the host machine to its media access control MAC address and bridging information that maps the MAC address to (1) a physical interface on the PE if the host machine is behind (directly connected to) the PE or (2) a tunnel interface if the host machine is behind another PE.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
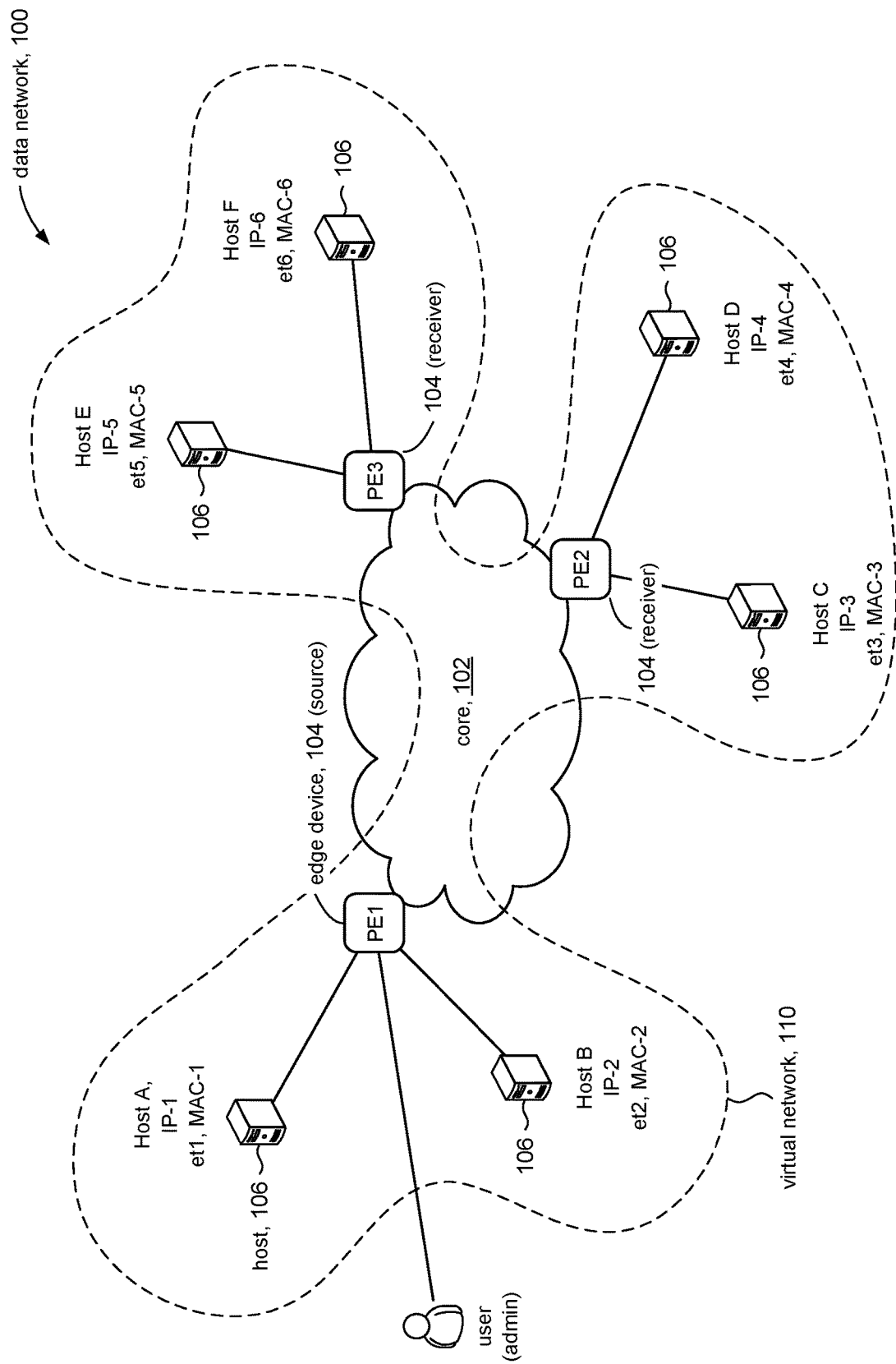
FIG. 1 is an example of a network to illustrate aspects of the present disclosure.

FIG. 1 is a high level diagram illustrating a data network 100 that can embody techniques in accordance with the present disclosure. Data network 100 represents an EVPN deployment comprising a core network 102 and provider edge devices (PEs) 104. Host machines (clients, servers, and other devices) 106 connect to the edge devices.

In some embodiments, data network 100 is an overlay/underlay architecture based on the VxLAN (virtual extensible local area network) protocol. For discussion purposes, VxLAN will be used as an example. However, it will be appreciated by persons of ordinary skill in the art that the present disclosure can be adapted to any suitable overlay/underlay architecture.

VxLAN technology is understood. Briefly, VxLAN creates virtual (overlay) networks that run on top of a physical (underlay) network. With VxLAN, the overlay network is a Layer 2 (L2) Ethernet network. The underlay network is a Layer 3 (L3) IP network. In FIG. 1, for example, the core network 102 represents the underlay network. For discussion purposes, the deployment shown in FIG. 1 represents a single virtual network 110 (overlay) that is stretched across the underlay. It will be appreciated by persons of ordinary skill in the art that additional virtual networks can be defined on the underlay.

VxLAN is a tunneling protocol that encapsulates L2 Ethernet frames (e.g., received from hosts 106) in L3 IP packets which are transported (tunneled) across the underlay. At the other end, the L3 packets are decapsulated to recover the L2 frames. The edge devices 104 perform the encapsulation and decapsulation and are referred to as VxLAN tunnel endpoints (VTEPs).

In some embodiments, the underlying hardware that constitutes the core network can be a spine/leaf topology, although it is understood that other networking architectures can be used. With respect to a spine/leaf architecture, the edge devices 104 are the leaf layer nodes to which hosts 106 connect. The spine layer constitutes the core network 102 and provides transport between the edge devices.

Core network 102 can support multicast traffic among hosts 106. Multicast traffic is traffic comprising IP packets that have a destination IP address in the range 224.0.0.0 to 239.255.255.255 (in the case of IPv4). By comparison, broadcast traffic comprises IP packets that have a destination IP address of 255.255.255.255. In some embodiments, the Protocol Independent Multicast (PIM) tunneling mechanism can be used in the core network 102 (underlay) to deliver overlay multicast traffic between edge devices 104. For discussion purposes, the present disclosure will use PIM Sparse mode as an illustrative example. It will, however, be appreciated by persons of ordinary skill in the art that other tunneling technologies can be used to deliver multicast traffic.

Overlay multicast traffic is carried by tunnels that extend between edge devices 104 of core network 102. A tunnel carries traffic for one or more multicast groups to edge devices that have hosts 106 who have joined the groups. A multicast group can be identified by the destination IP address of the multicast traffic. In the case of PIM, tunnels are defined using Selective Provider Multicast Service Interface Auto-Discovery (S-PMSI-AD) routes which advertise tunnels that deliver overlay multicast traffic. The advertised S-PMSI-AD routes map an overlay multicast source, group (overlay (S, G)) to a corresponding underlay multicast source, group (underlay (S, G)).

FIG. 1 shows PE1 is a source PE, which means that one or more hosts 106 behind PE1 transmits multicast traffic who then transmits the multicast traffic into the core 102. Host A and Host B are deemed to be behind (directly connected to, locally connected to) PE1 in that these hosts are connected to physical interfaces on PE1. FIG. 1 shows PE2 and PE3 to be receiver PEs, which means that one or more hosts host 106 behind PE2 and PE3 receive multicast traffic.

The advertisement of EVPN routes, called S-PMSI-AD routes, informs PEs of multicast groups and how traffic for a multicast group is encapsulated (tunneled) on the core network 102. The advertised S-PMSI-AD routes give PEs an opportunity to join one or more multicast groups to receive traffic sent to the group.

Figure 2:
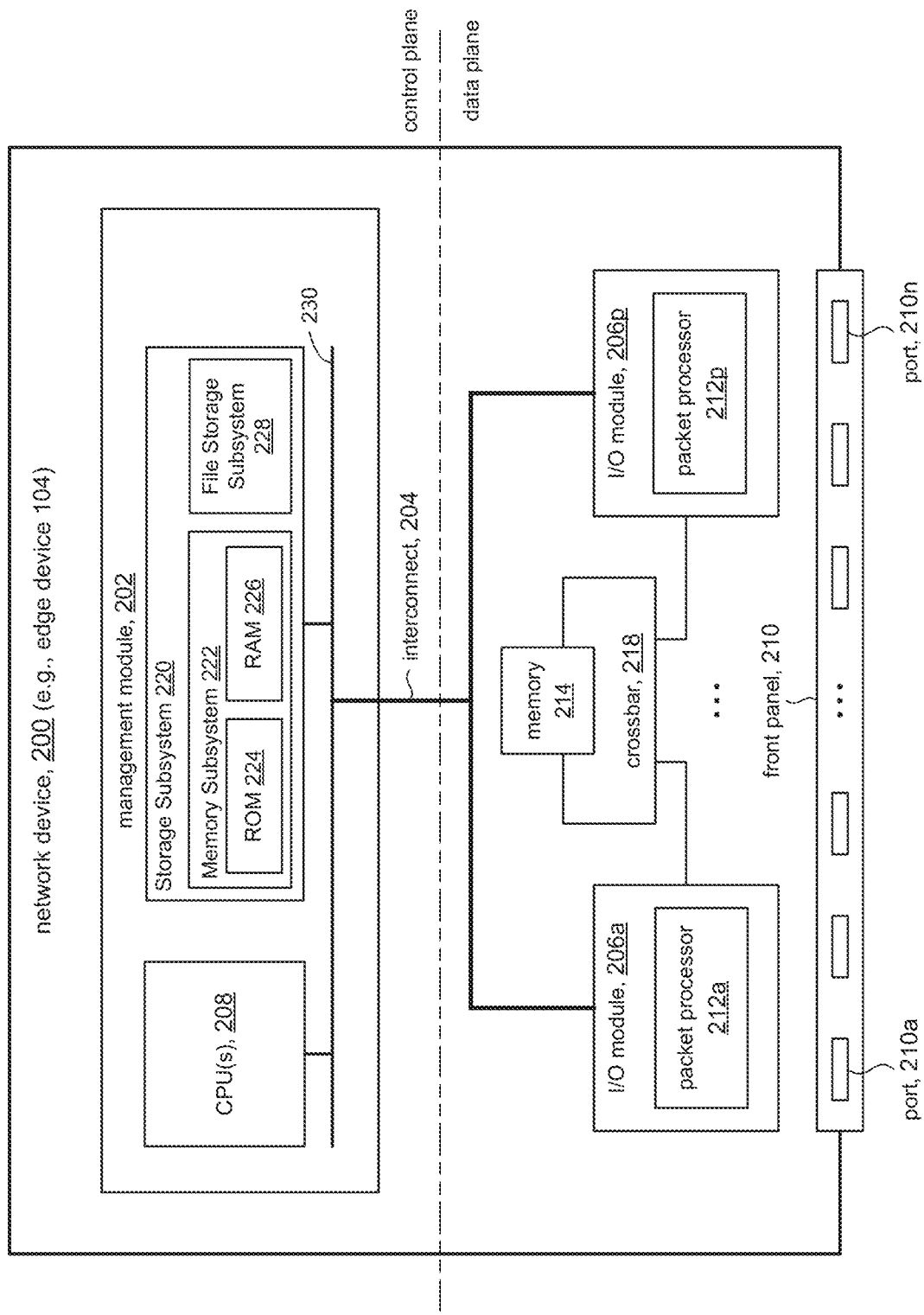
FIG. 2 represents an example of a network device that can be adapted in accordance with the present disclosure.

FIG. 2 is a schematic representation of a network device 200 (e.g., edge device 104) that can be adapted in accordance with the present disclosure. In some embodiments, for example, network device 200 can include a management module 202, one or more I/O modules 206a-206p, and a front panel 210 of I/O ports (physical interfaces, I/Fs) 210a-210n. Management module 202 can constitute the control plane (also referred to as a control layer or simply the CPU) of network device 200 and can include one or more management CPUs 208 for managing and controlling operation of network device 200 in accordance with the present disclosure. Each management CPU 208 can be a general-purpose processor, such as an Intel®/AMD® x86, ARM® microprocessor and the like, that operates under the control of software stored in a memory device/chips such as ROM (read-only memory) 224 or RAM (random-access memory) 226. The control plane provides services that include traffic management functions such as routing, security, load balancing, analysis, and the like.

The one or more management CPUs 208 can communicate with storage subsystem 220 via bus subsystem 230. Other subsystems, such as a network interface subsystem (not shown in FIG. 2), may be on bus subsystem 230. Storage subsystem 220 can include memory subsystem 222 and file/disk storage subsystem 228. Memory subsystem 222 (e.g., ROM 224) and file/disk storage subsystem 228 represent examples of non-transitory computer-readable storage devices that can store program code and/or data, which when executed by one or more management CPUs 208, can cause one or more management CPUs 208 to perform operations in accordance with embodiments of the present disclosure.

Memory subsystem 222 can include a number of memories such as main RAM 226 (e.g., static RAM, dynamic RAM, etc.) for storage of instructions and data during program execution, and ROM 224 on which fixed instructions and data can be stored. File storage subsystem 228 can provide persistent (i.e., non-volatile) storage for program and data files, and can include storage technologies such as solid-state drive and/or other types of storage media known in the art.

Management CPUs 208 can run a network operating system stored in storage subsystem 220. A network operating system is a specialized operating system for network device 200. For example, the network operating system can be the Arista EOS© operating system, which is a fully programmable and highly modular, Linux-based network operating system, developed and sold/licensed by Arista Networks, Inc. of Santa Clara, California. Other network operating systems may be used.

Bus subsystem 230 can provide a mechanism for the various components and subsystems of management module 202 to communicate with each other as intended. Although bus subsystem 230 is shown schematically as a single bus, alternative embodiments of the bus subsystem can utilize multiple buses.

The one or more I/O modules 206a-206p can be collectively referred to as the data plane of network device 200 (also referred to as data layer, forwarding plane, etc.). Interconnect 204 represents interconnections between modules in the control plane and modules in the data plane. Interconnect 204 can be a PCIe (Peripheral Component Interconnect Express) bus or any other suitable bus architecture (e.g., SMBus (System Management Bus), I²C (Inter-Integrated Circuit), etc.). I/O modules 206a-206p can include respective packet processing hardware comprising packet processors 212a-212p and memory hardware 214, to support packet processing and forwarding capability. Each I/O module 206a-206p can be further configured to communicate over one or more ports 210a-210n on the front panel 210 to receive and forward network traffic.

Packet processors 212a-212p can comprise hardware (circuitry), including for example, data processing hardware such as an ASIC (application specific integrated circuit), FPGA (field programmable array), digital processing unit, and the like. Memory hardware 214 can include lookup hardware, for example, content addressable memory such as TCAMs (ternary CAMs) and auxiliary memory such as SRAMs (static RAM). I/O modules 206a-206p can access memory hardware 214 via crossbar 218. It is noted that in other embodiments, the memory hardware 214 can be incorporated into each I/O module. The forwarding hardware in conjunction with the lookup hardware can provide wire speed decisions on how to process ingress packets and outgoing packets for egress.

Figure 3:
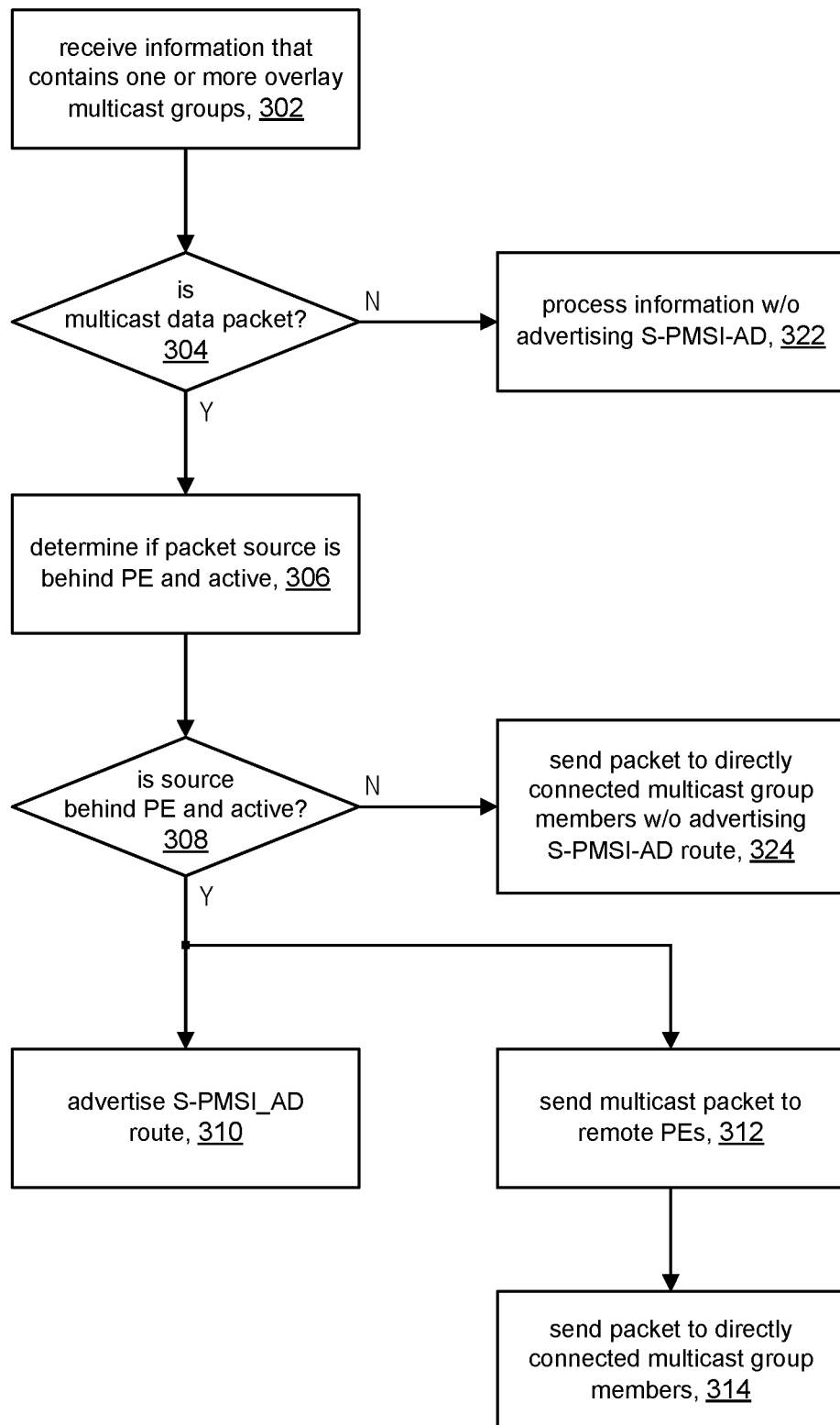
FIG. 3 shows selective advertising in accordance with the present disclosure.
Figure 4A:
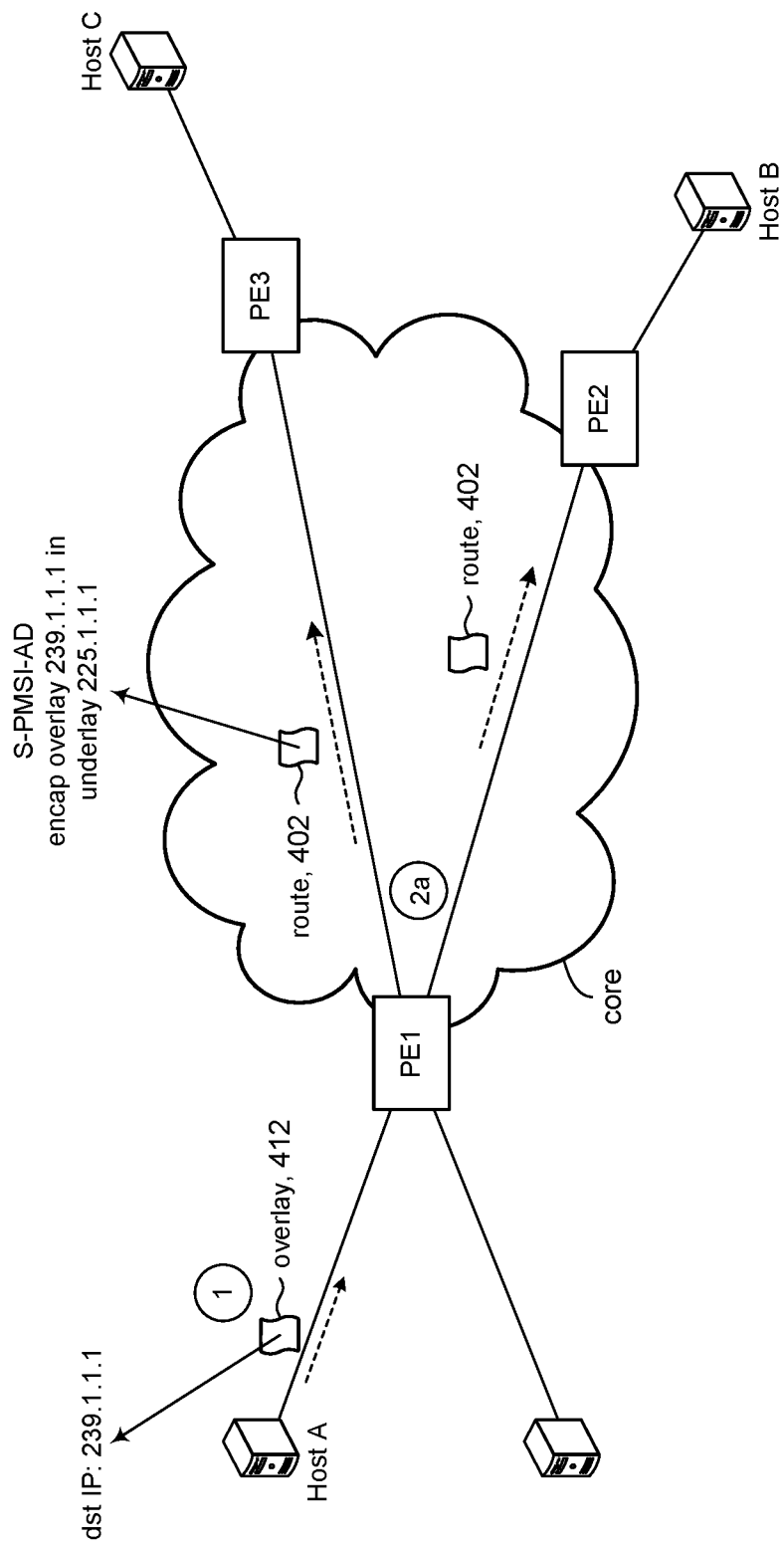
FIGS. 4A and 4B illustrate examples for the discussion of FIG. 3.
Figure 4B:
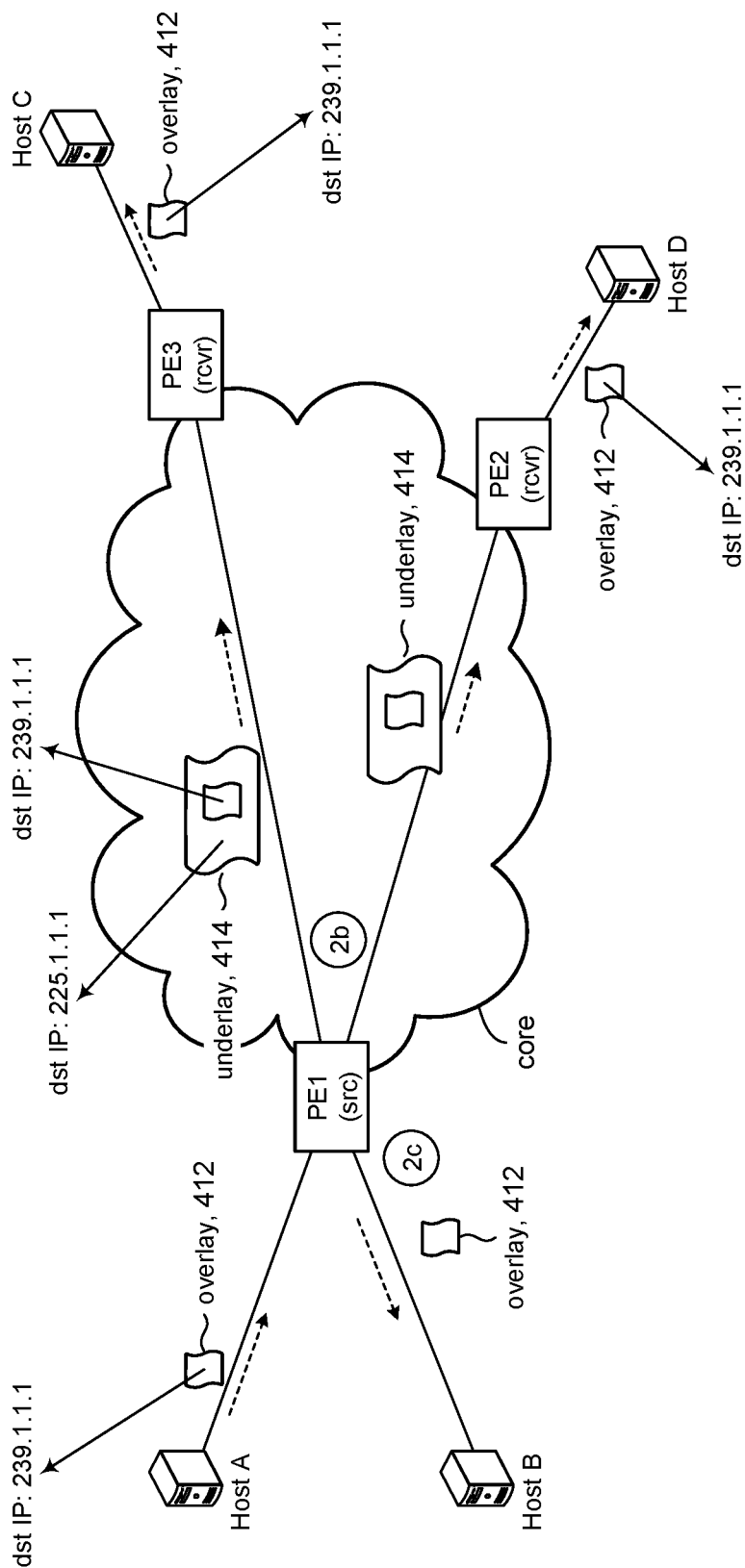

Referring now to FIGS. 3, 4A, and 4B, the discussion will turn to a high-level description of processing in a network device operating as a PE device (e.g., edge device 104 in FIG. 1) for advertising S-PMSI-AD routes in accordance with the present disclosure. Depending on implementation, the processing may occur entirely in the control plane or entirely in the data plane, or the processing may be divided between the control plane and the data plane. In some embodiments, the network device can include one or more digital processing units (circuits), which when operated, can cause the network device to perform processing in accordance with FIG. 3. Digital processing units (circuits) in the control plane can include general CPUs that operate by way of executing computer program code stored on a non-volatile computer readable storage medium (e.g., read-only memory); for example, CPU 208 in the control plane (FIG. 2) can be a general CPU. Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 212a-212p in the data plane (FIG. 2) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 302, the PE can learn or know about overlay multicast groups when it receives information that includes one or more overlay multicast groups. For example, the PE can learn about an overlay multicast group when it receives multicast traffic from a host directly connected to the PE (e.g., connected to a physical port on the PE). Referring for a moment to FIG. 1, suppose Host A (directly connected to PE1) sends a multicast packet to PE1 to an overlay multicast group (say Group A). Multicast packets have multicast group information in them (e.g., the destination IP address in the packet is in the multicast address range of 224.0.0.0 to 239.255.255.255). PE1 will learn about Group A by virtue of the destination IP in the multicast packet being in the range 224.0.0.0 to 239.255.255.255. For discussion purposes, a "multicast packet" will be understood to refer to a multicast "data" packet, which is a packet containing data that originates from a host machine 106 and is multicast to other host machines. This is in contrast to multicast "control" packets discussed below.

The PE may know about an overlay multicast group even if there is no source behind the PE for that group. For example, the PE may know about overlay multicast groups because it receives multicast traffic for that group from sources behind remote PEs. Referring again to FIG. 1, suppose Host E (behind PE3) sends a multicast packet for multicast Group B to PE1, PE1 will learn about Group B by virtue of receiving the multicast packet even though the packet did not originate from a host behind PE1.

The PE can learn about overlay multicast groups in ways other than by receiving a multicast data packet that originates from host. For example, a PE may know about an overlay multicast group when there are hosts somewhere in the network that want to receive multicast traffic for that group. Referring for a moment to FIG. 1, for instance, Host D (behind PE2) can request to receive multicast traffic for an overlay multicast group (say, Group C) by sending an IGMP (Internet Group Management Protocol) Membership Report to become a member of Group C. PE1 will learn about overlay multicast group Group C when it receives and processes the Membership Report. In addition, with EVPN, the information in IGMP reports in a PE can be sent across to other PEs via EVPN Type 6 routes as well as EVPN Type 7 routes. So, a PE receiving Type 6 and Type 7 routes can be another way the PE can know about multicast groups As another example, the PE may know about an overlay multicast group because a network administrator configures the PE with information for that group; e.g., a command entered via user interface in the control layer such as a CLI. For example, the configuration command:

overlay multicast group 239.1.1.1 encapsulation multicast group 225.1.1.1 specifies how to encapsulate multicast packets for a given overlay multicast group (e.g., 239.1.1.1) in an underlay multicast packet. The PE will know about the multicast group by virtue of receiving and processing the configuration command.

At decision point 304, if the information received at operation 302 is a multicast packet sent by a host, then processing can proceed to operation 306 ('Y' branch). If the received information is not a multicast packet sent by a host, then processing can proceed to operation 322 ('N' branch). As noted above a "multicast packet" is understood to refer to a multicast "data" packet that comprises data originating from a host machine (e.g., 106). By comparison, PE devices 104 can send "control" packets such as IGMP Member Reports and the like which are consumed by other PE devices and which can also be multicast. Such packets can be referred to herein as multicast "control" packets to distinguish host-originated multicast data packets.

At operation 306, the PE can determine if the source (sender) of the multicast packet is connected to or otherwise behind the PE. The determination whether the source of the multicast packet is connected to or otherwise behind the PE can be made by any suitable mechanism. In some embodiments, for example, the address resolution protocol (ARP) can be used to make this determination. This aspect of the present disclosure is discussed in more detail below in connection with FIG. 5.

At decision point 308, if the source of the multicast packet is determined to be behind the PE, then processing can proceed to operations 310 and 312. If the source of the multicast packet is not behind the PE, then processing can proceed to operation 324. As indicated in FIG. 3, it will be appreciated that operation 310 and operation 312 can be concurrent operations. In some embodiments, for example, operations 310 and 312 may be performed by separate processes running concurrently on the PE.

At operation 310, in response to a determination at decision point 308 that the source of the received multicast packet is behind the PE, the (source) PE can advertise an S-PMSI-AD route to other (receiver) PEs in the network. An S-PMSI-AD route informs the receiver PEs about the overlay multicast group. An S-PMSI-AD route also serves to inform the receiver PEs how the source PE will encapsulate overlay multicast packets in underlay multicast packets; e.g., how the overlay multicast traffic will be tunneled to the receive PEs; for example, by providing underlay tunnel information such as the underlay multicast group. Referring for a moment to FIG. 4A, suppose at time index 1 (indicated by the circled number) PE1 receives an overlay multicast packet 412 from Host A (behind PE1) that specifies a multicast destination IP of 239.1.1.1. In response, at time index 2a, PE1 can generate and advertise an S-PMSI-AD route 402 to inform the remote PEs (e.g., PE2 and PE3) that overlay multicast packets for the 239.1.1.1 multicast group will be encapsulated in underlay packets having a multicast IP of 225.1.1.1 (e.g., per the user configuration example shown above). The advertisement can cause PE2 and PE3 to join the underlay multicast tree for group 225.1.1.1 and to accept and process underlay packets addressed to 225.1.1.1.

At operation 312, the PE can send (multicast) the multicast packet to the receiver PEs. Referring to FIG. 4B, for example, the figure shows that (at time index 2b) PE1 can encapsulate overlay multicast packet 412 in an underlay multicast packet 414 (where the overlay multicast packet is the payload portion of the underlay multicast packet), and multicast the underlay multicast packet to the other PEs (PE2, PE3). PE2 and PE3 can decapsulate the received underlay multicast packet 414 to recover the overlay multicast packet 412 and deliver the recovered packet to Host D and Host C, respectively.

At operation 314, the PE can send the multicast packet to hosts behind the PE (also referred to as directly connected hosts, local hosts). Local hosts that are members of the multicast group will accept and process the multicast packet, whereas local hosts that are not members of the multicast group can drop the multicast packet. FIG. 4B illustrates an example, where PE1 sends (at time index 2c) overlay multicast packet 412 to Host B. Because Host B is local to PE1, the overlay multicast packet is not encapsulated. Operations 310, 312, and 314 can be concurrent operations, as emphasized by using the same numerical component for time indices 2a, 2b, 2c. Processing the multicast packet can be deemed complete.

At operation 322, in response to a determination, at decision point 304, that the information received at operation 302 contains a multicast group, but the information is not a multicast data packet (i.e., does not originate from a host), the PE can process the received information. In accordance with the present disclosure, the PE does not send an S-PMSI-AD route to advertise the multicast group. Because the received information does not involve the PE sending multicast packets for the multicast group, there is no benefit to advertising an S-PMSI-AD route to the other (remote) PEs at this time. By not advertising an S-PMSI-AD route until such time that the advertisement is needed (see operation 310), bandwidth and computing resources in the core and in the remote PEs can be conserved. Processing the received information can be deemed complete.

At operation 324, in response to a determination, at decision point 308, that the received information is a multicast packet and that the source of the received multicast packet is not behind the PE, the PE can send the packet to hosts behind the PE (i.e., directly connected hosts). Because the received multicast packet did not originate from a host that is behind the PE, the PE does not multicast the received multicast packet back to the core to the other PEs. Accordingly, in accordance with the present disclosure, the PE does not send an S-PMSI-AD route to advertise the multicast group and underlay tunnel information to the other PEs. By delaying the advertising of an S-PMSI-AD route until such time that the advert is needed (see operation 310), bandwidth and computing resources in the core and in the remote PEs for processing a S-PMSI-AD route can be conserved. Processing the received multicast packet can be deemed complete.

Figure 5:
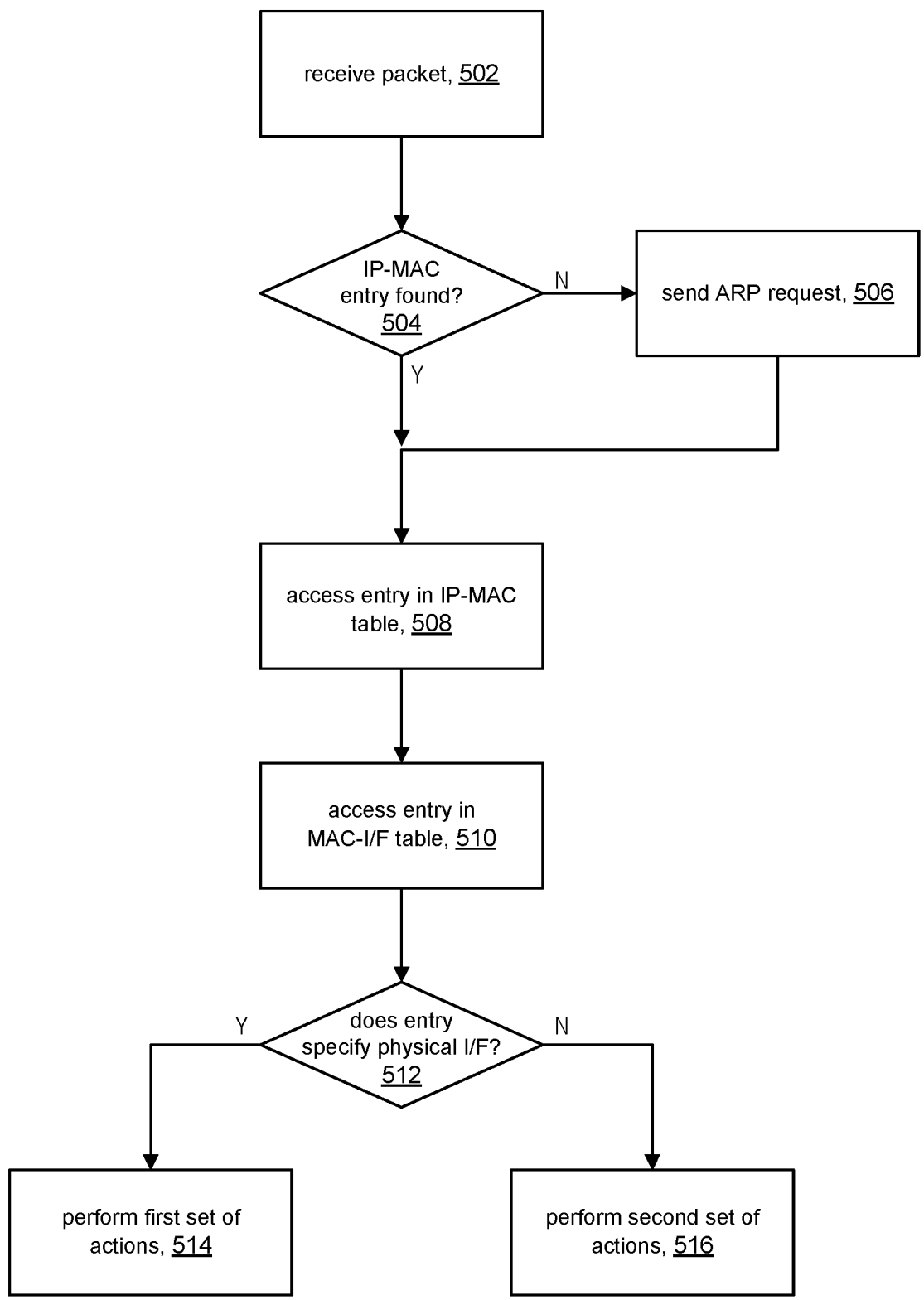
FIG. 5 shows determining locality in accordance with the present disclosure.
Figure 6A:
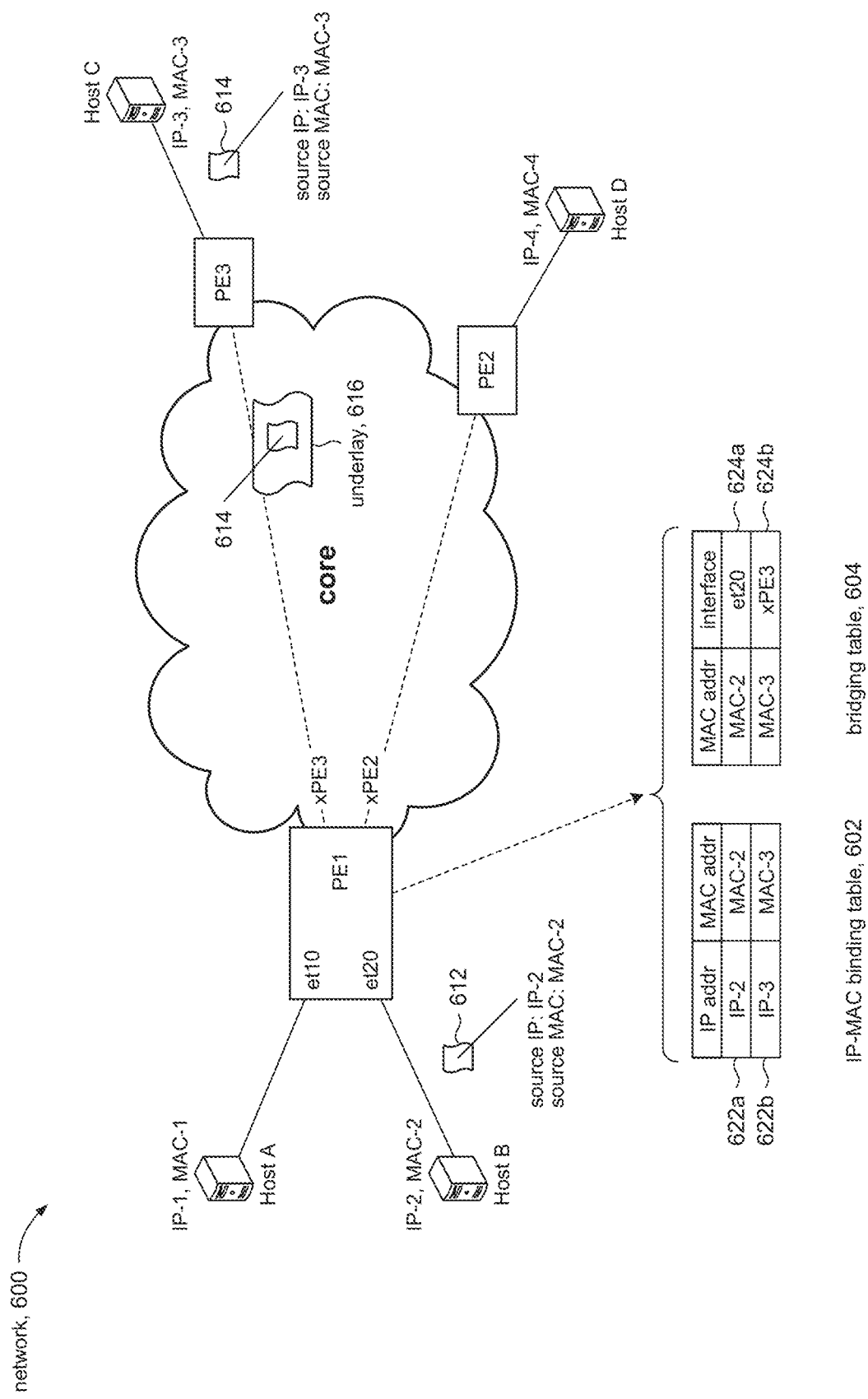
FIGS. 6A and 6B illustrate examples for the discussion of FIG. 5.
Figure 6B:
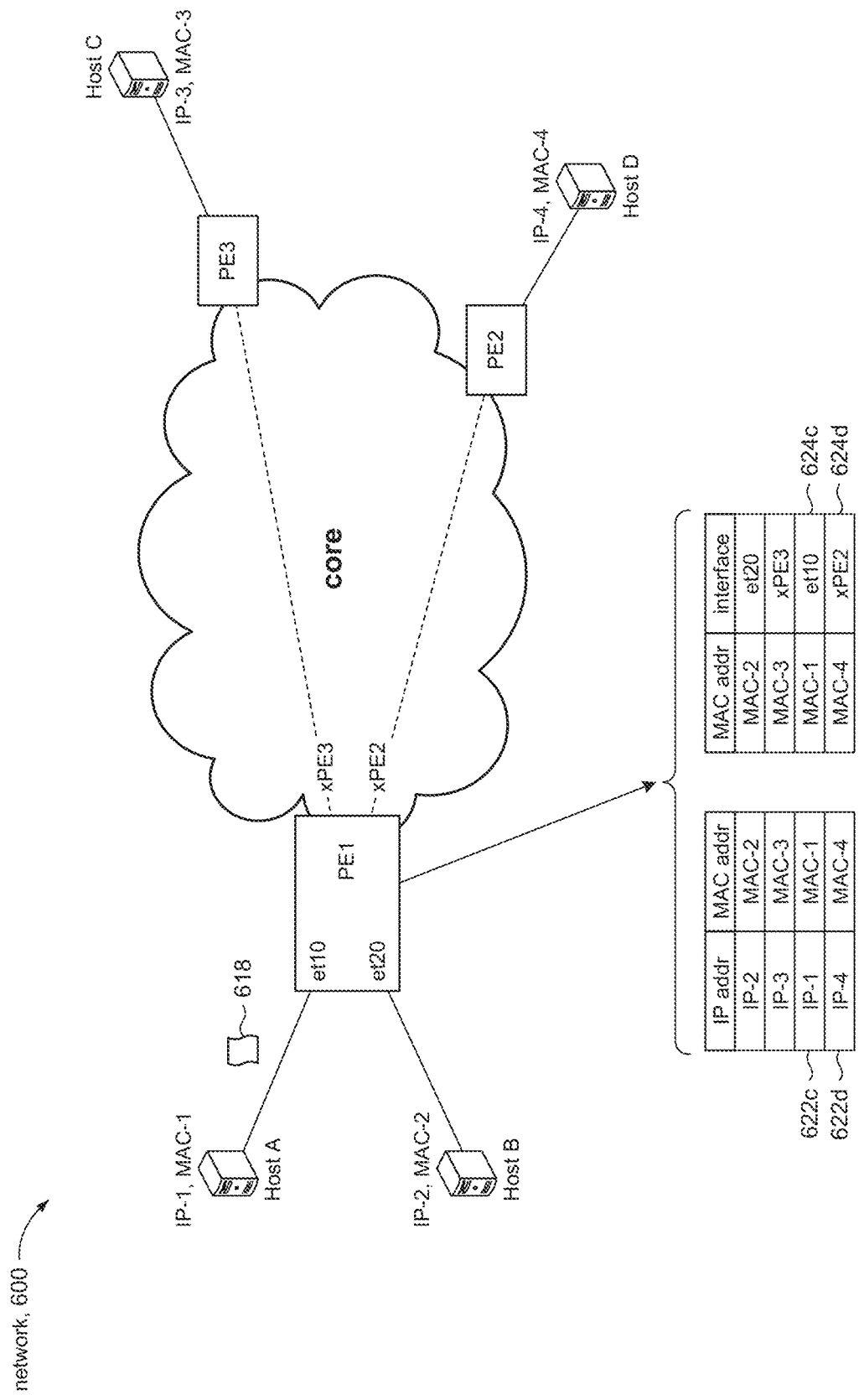

Referring now to FIGS. 5, 6A, and 6B, the discussion will turn to a high-level description of processing in a network device in accordance with the present disclosure for determining whether the sender of a data packet is behind the network device or is not behind the network device (e.g., operation 306 in FIG. 3). Depending on implementation, the processing may occur entirely in the control plane or entirely in the data plane, or the processing may be divided between the control plane and the data plane. In some embodiments, the network device can include one or more digital processing units (circuits), which when operated, can cause the network device to perform processing in accordance with FIG. 5. Digital processing units (circuits) in the control plane can include general CPUs that operate by way of executing computer program code stored on a non-volatile computer readable storage medium (e.g., read-only memory); for example, CPU 208 in the control plane (FIG. 2) can be a general CPU.

Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 212a-212p in the data plane (FIG. 2) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the network device can receive a packet. In accordance with some embodiments, the network device can decide how to process the packet based on whether the sender of the packet is locally attached to (local, directly connected, behind) the network device or remotely attached to the network device. Processing in FIG. 3, for example, includes making such a determination, at operations 306/308. Referring for a moment to FIG. 6A, Host A and Host B can be deemed "local" to (or behind) network device PE1 because they are directly connected to respective physical interfaces et10, et20 of PE1. On the other hand, Host C can be referred to as being remotely attached to PE1 because Host C is not connected to a physical interface of PE1, rather, Host C is connected to a physical interface on PE3. Host C is "remotely attached" to PE1 by way of PE3.

At decision point 504, the network device can look up an entry in an IP-MAC binding table using the source IP address in the received packet. If an entry in the IP-MAC binding table is found for the source IP address in the received packet, then processing can proceed to operation 508. If the IP-MAC binding table does not have an entry that matches the source IP address in the received packet, then processing can proceed to operation 506.

Referring to network 600 in FIG. 6A, for example, the figure shows an IP-MAC binding table 602. The IP-MAC binding table provides a mapping between an IP address of the source of the received packet and the MAC address of the source. When a host (e.g., Host B) sends a packet 612 to network device PE1, the source IP and source MAC addresses (IP-2, MAC-2) of the host are contained in the packet and can be stored in an entry 622a in the IP-MAC binding table 602. Likewise, when a host (e.g., Host C) that is behind another PE (e.g., PE3) sends a (overlay) packet 614 to PE1, the packet will be encapsulated in an underlay packet 616 by PE3 and sent to PE1. PE1 will decapsulate the received underlay packet to recover the overlay packet 614 from Host C. PE1 can store the source IP and MAC addresses (IP-3, MAC-3) of Host C, contained in the recovered packet 614 in an entry 622b in the IP-MAC table binding table 602.

FIG. 6A also shows a bridging table 604. Entries in the bridging table comprise the source MAC address in a received packet and the interface on the PE on which the packet was received. Consider, for example, the packet 612 sent from Host B to PE1. An entry 624a can be added to the bridging table 604 that comprises the MAC address (MAC-2) contained in the packet and the interface of PE1 on which the packet was received. Because Host B is directly connected to physical interface et20 on PE1, the interface field in the entry 624a contains et20. With respect to the packet 614 from Host C, an entry 624b can be added to the bridging table 604 comprising the MAC address (MAC-3) contained in the recovered packet. However, instead of the physical interface on which the underlay packet from PE3 was received, the entry 624b will contain a suitable identifier (e.g., 'xPE3') that represents a logical interface, rather than a physical interface on PE1, to indicate that the overlay packet 614 arrived from a remote PE (namely, PE3).

At operation 506, in response to a determination, at decision point 504, that the IP-MAC binding table does not have an entry that matches the source IP address in the received packet, the network device can send an ARP (address resolution protocol) Request. ARP is well understood. An ARP request essentially asks for the MAC address associated with a given IP address. Briefly, the ARP request containing the IP address of interest is broadcast to the network. The device whose IP address is the IP address contained in the ARP request will respond with an ARP response containing that device's MAC address. A result of sending the ARP request is the addition of entries to the IP-MAC binding table and the bridging table of the sender of the ARP request.

Referring to FIG. 6A, for example, the IP-MAC table 602 and bridging table 604 in PE1 do not include entries for IP addresses IP-1 and IP-4 (the IP addresses of Host A and Host D, respectively). FIG. 6B shows the tables 602, 604 after PE1 broadcasts an ARP request for IP-1 to all devices in the network 600. Host A (a local host with respect to PE1) will respond by sending an ARP response to PE1 because IP-1 is the IP address of Host A. When PE1 receives the ARP response from Host A, it will add entries 622c, 624c to respective tables 602, 604. In particular, entry 624c in bridging table 604 will comprise MAC-1 and et10, where et10 is the physical interface on PE1 on which the ARP response from local Host A was received.

Consider IP address IP-4. FIG. 6B shows that in response to PE1 broadcasting an ARP request for IP-4 to the network, Host D (a remotely attached host) will respond by sending an ARP response to PE1 because IP-4 is the IP address of Host D. Entries 622d, 624d will be added to respective tables 602, 604. In particular, entry 624d in bridging table 604 will comprise MAC-4 and an identifier 'xPE2' to indicate that the response was received from a device, namely Host D, located behind another PE, namely PE2.

At operation 508, the network device can access an entry in the IP-MAC binding table (e.g., 602) using the source IP address contained in the received packet to obtain the MAC address associated with the source IP address.

At operation 510, the network device can access an entry in the bridging table (e.g., 604) using the MAC address obtained at operation 508 to obtain the interface contained in the "interface" field of the accessed entry.

At decision point 512, if the interface contained in the "interface" field of the entry in the bridging table, accessed at operation 510, refers to or is otherwise a reference to a physical interface on the network device, then the packet received at operation 502 can be deemed to have been sent by a device behind the network device. Referring to FIG. 6B, for example, the binding table and bridging table lookups for a packet 618 from Host A will yield an interface of "et10" which is a physical interface on PE1, and so Host A can be deemed to be behind PE1. Note that, as shown in FIG. 6A, Host A does not have entries in the binding and bridging tables 602, 604; for example, if Host A only sends multicast traffic the binding and bridging tables in PE1 will not contain information about Host A. Nonetheless, per the present disclosure, the ARP request processing described at operation 506 serves to create table entries for Host A in the binding and bridging tables 602, 604, as shown in FIG. 6B so that the subsequent operations (508, 510, 512) can be performed to determine that Host A is local to PE1.

Referring again to FIG. 6B, if the interface contained in the "interface" field of the entry in the bridging table does not refer to a physical interface on the network device, then the received packet can be deemed to have been sent by a device behind a remote PE. In FIG. 6B, for example, Host D can be deemed to be not behind PE1, but rather is behind remote PE2. The IP-MAC table and bridging table lookups for packet 614 yields "xPE2" which is an identifier that does not refer to a physical interface on PE1, but rather is a reference to PE2.

If the received packet is deemed to have been sent by a device behind the network device, then processing can proceed to operation 514. If the received packet is not deemed to have been sent by a device behind the network device, then processing can proceed to operation 516.

At operation 514, the network device can perform a first set of operations in response to determining that the received packet was sent by a device behind the network device. In some embodiments, for example, the first set of operations can comprise 310, 312, 314 shown in FIG. 3. Processing can be deemed complete.

At operation 516, the network device can perform a second set of operations in response to determining that the received packet was not sent by a device behind the network device, but rather by a device behind another PE. In some embodiments, for example, the second set of operations can comprise operation 324 shown in FIG. 3. Processing can be deemed complete.

Further Examples

Features described above as well as those claimed below may be combined in various ways without departing from the scope hereof. The following examples illustrate some possible, non-limiting combinations:

(A1) A method in a network device, the method comprising the network device: receiving a packet from a sender, wherein the sender is either behind the network device or is not behind the network device; and performing a first set of operations or a second set of operations, in response to receiving the packet, based on whether the sender of the packet is behind the network device or not behind the network device, including: transmitting an address resolution protocol (ARP) request, the ARP request comprising an internet protocol (IP) address of the sender; receiving an ARP response from the sender, the ARP response comprising a media access control (MAC) address of the sender; associating the IP address of the sender with the MAC address contained in the ARP response; associating the MAC address with an interface of the the network device on which the ARP response was received, wherein the sender is deemed directly connected to the network device when the interface is a reference to a physical port of the network device, wherein the sender is deemed not directly connected to the network device when the interface is not a reference to any physical port of the network device; performing the first set of operations in response to the sender being deemed to be behind the network device; and performing the second set of operations in response to the sender not deemed to be behind the network device.

(A2) For the method denoted as (A1), the first set of operations includes advertising a S-PMSI-AD (Selective Provider Multicast Service Interface Auto-Discovery) route to other network devices in a network to which the network device belongs, wherein the second set of operations does not include advertising a S-PMSI-AD route to the other network devices in the network.

(A3) For the method denoted as any of (A1) through (A2), the received packet is a multicast data packet.

(A4) For the method denoted as any of (A1) through (A3), the received packet is a multicast packet, wherein the first set of operations includes processing the multicast packet in addition to advertising a S-PMSI-AD route to other network devices in a network to which the network device belongs, wherein the second set of operations includes processing the multicast packet without advertising the S-PMSI-AD route to the other network devices in the network.

(A5) For the method denoted as any of (A1) through (A4), the network device is a provider edge (PE) device among a plurality of PE devices in an EVPN, wherein the sender is deemed not directly connected to the network device when the sender is behind one of the other PE devices among the plurality of PE devices.

(A6) For the method denoted as any of (A1) through (A5), when the sender is behind one of the other PE devices among the plurality of PE devices, the interface on which the ARP response was received refers to that other PE device.

(B1) A network device comprising: one or more computer processors; and a computer-readable storage device comprising instructions for controlling the one or more computer processors to: receive a packet from a sender; determine whether the sender of the packet is behind the network device or not behind the network device, including: transmitting an ARP request comprising an internet protocol (IP) address of the sender; and receiving an ARP response from the sender, the ARP response comprising a media access control (MAC) address of the sender, wherein the sender is deemed directly connected to (behind) the network device when an interface on which the ARP response is received is a reference to a physical port of the network device, wherein the sender is deemed not directly connected to (not behind) the network device when the interface is not a reference to any physical port of the network device; and perform a first set of operations in response to the sender being deemed to be behind the network device.

(B2) The network device denoted as (B1), further comprising performing a second set of operations in response to the sender not being deemed to be not behind the network device.

(B3) For the network device denoted as any of (B1) through (B2), the first set of operations includes advertising a S-PMSI-AD route to other network devices in a network to which the network device belongs, wherein the second set of operations does not include advertising a S-PMSI-AD route to the other network devices in the network.

(B4) For the network device denoted as any of (B1) through (B3), the received packet is a multicast packet.

(B5) For the network device denoted as any of (B1) through (B4), the received packet is a multicast packet, wherein the first set of operations includes processing the multicast packet in addition to advertising a S-PMSI-AD route to other network devices in a network to which the network device belongs.

(B6) The network device denoted as any of (B1) through (B5), further comprising performing a second set of operations in response to the sender not being deemed to be not behind the network device, wherein the second set of operations includes processing the multicast packet without advertising the S-PMSI-AD route to the other network devices in the network.

(B7) For the network device denoted as any of (B1) through (B6), the network device is a provider edge (PE) device among a plurality of PE devices in an EVPN, wherein the sender is deemed not directly connected to the network device when the sender is behind one of the other PE devices among the plurality of PE devices.

(B8) For the network device denoted as any of (B1) through (B7), when the sender is behind one of the other PE devices among the plurality of PE devices, the interface on which the ARP response was received refers to that other PE device.

(C1) A method in a network device, the method comprising the network device: receiving a packet from a sender, wherein the sender is either behind the network device or is not behind the network device; determining whether the sender of the packet is behind the network device or not behind the network device, including: transmitting an address resolution protocol (ARP) request, the ARP request comprising an internet protocol (IP) address of the sender; and receiving an ARP response from the sender, the ARP response comprising a media access control (MAC) address of the sender, wherein the sender is deemed directly connected to the network device when an interface on which the ARP response is received is a reference to a physical port of the network device, wherein the sender is deemed not directly connected to the network device when the interface is not a reference to any physical port of the network device; performing a first set of operations when the sender is deemed to be behind the network device; and performing a second set of operations when the sender is not deemed to be behind the network device.

(C2) For the method denoted as (C1), the first set of operations includes advertising a S-PMSI-AD route to other network devices in a network to which the network device belongs, wherein the second set of operations does not include advertising a S-PMSI-AD route to the other network devices in the network.

(C3) For the method denoted as any of (C1) through (C2), the received packet is a multicast packet.

(C4) For the method denoted as any of (C1) through (C3), 18. The method of claim 15, wherein the received packet is a multicast packet, wherein the first set of operations includes processing the multicast packet in addition to advertising a S-PMSI-AD route to other network devices in a network to which the network device belongs, wherein the second set of operations includes processing the multicast packet without advertising the S-PMSI-AD route to the other network devices in the network.

(C5) For the method denoted as any of (C1) through (C4), the network device is a provider edge (PE) device among a plurality of PE devices in an EVPN, wherein the sender is deemed not directly connected to the network device when the sender is behind one of the other PE devices among the plurality of PE devices.

(C6) For the method denoted as any of (C1) through (C5), when the sender is behind one of the other PE devices among the plurality of PE devices, the interface on which the ARP response was received refers to that other PE device.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising the network device:
receiving a packet from a sender, wherein the sender is either behind the network device or is not behind the network device; and
performing a first set of operations or a second set of operations, in response to receiving the packet, based on whether the sender of the packet is behind the network device or not behind the network device, including:
transmitting an address resolution protocol (ARP) request, the ARP request comprising an internet protocol (IP) address of the sender;
receiving an ARP response from the sender, the ARP response comprising a media access control (MAC) address of the sender;
associating the IP address of the sender with the MAC address contained in the ARP response;
associating the MAC address with an interface of the network device on which the ARP response was received, wherein the sender is deemed directly connected to the network device when the interface is a reference to a physical port of the network device, wherein the sender is deemed not directly connected to the network device when the interface is not a reference to any physical port of the network device;
performing the first set of operations in response to the sender being deemed to be behind the network device; and
performing the second set of operations in response to the sender not deemed to be behind the network device.

2. The method of claim 1, wherein the first set of operations includes advertising a S-PMSI-AD (Selective Provider Multicast Service Interface Auto-Discovery) route to other network devices in a network to which the network device belongs, wherein the second set of operations does not include advertising a S-PMSI-AD route to the other network devices in the network.

3. The method of claim 1, wherein the received packet is a multicast data packet.

4. The method of claim 1, wherein the received packet is a multicast packet, wherein the first set of operations includes processing the multicast packet in addition to advertising a S-PMSI-AD route to other network devices in a network to which the network device belongs, wherein the second set of operations includes processing the multicast packet without advertising the S-PMSI-AD route to the other network devices in the network.

5. The method of claim 1, wherein the network device is a provider edge (PE) device among a plurality of PE devices in an EVPN, wherein the sender is deemed not directly connected to the network device when the sender is behind one of the other PE devices among the plurality of PE devices.

6. The method of claim 5, wherein when the sender is behind one of the other PE devices among the plurality of PE devices, the interface on which the ARP response was received refers to that other PE device.

7. A network device comprising:
one or more computer processors; and
a computer-readable storage device comprising instructions for controlling the one or more computer processors to:
receive a packet from a sender;
determine whether the sender of the packet is behind the network device or not behind the network device, including:
transmitting an ARP request comprising an internet protocol (IP) address of the sender; and
receiving an ARP response from the sender, the ARP response comprising a media access control (MAC) address of the sender, wherein the sender is deemed directly connected to (behind) the network device when an interface on which the ARP response is received is a reference to a physical port of the network device, wherein the sender is deemed not directly connected to (not behind) the network device when the interface is not a reference to any physical port of the network device; and
perform a first set of operations in response to the sender being deemed to be behind the network device.

8. The network device of claim 7, further comprising performing a second set of operations in response to the sender not being deemed to be not behind the network device.

9. The network device of claim 8, wherein the first set of operations includes advertising a S-PMSI-AD route to other network devices in a network to which the network device belongs, wherein the second set of operations does not include advertising a S-PMSI-AD route to the other network devices in the network.

10. The network device of claim 7, wherein the received packet is a multicast packet.

11. The network device of claim 7, wherein the received packet is a multicast packet, wherein the first set of operations includes processing the multicast packet in addition to advertising a S-PMSI-AD route to other network devices in a network to which the network device belongs.

12. The network device of claim 11, further comprising performing a second set of operations in response to the sender not being deemed to be not behind the network device, wherein the second set of operations includes processing the multicast packet without advertising the S-PMSI-AD route to the other network devices in the network.

13. The network device of claim 7, wherein the network device is a provider edge (PE) device among a plurality of PE devices in an EVPN, wherein the sender is deemed not directly connected to the network device when the sender is behind one of the other PE devices among the plurality of PE devices.

14. The network device of claim 13, wherein when the sender is behind one of the other PE devices among the plurality of PE devices, the interface on which the ARP response was received refers to that other PE device.

15. A method in a network device, the method comprising the network device:
- receiving a packet from a sender, wherein the sender is either behind the network device or is not behind the network device;
- determining whether the sender of the packet is behind the network device or not behind the network device, including:
  - transmitting an address resolution protocol (ARP) request, the ARP request comprising an internet protocol (IP) address of the sender; and
  - receiving an ARP response from the sender, the ARP response comprising a media access control (MAC) address of the sender, wherein the sender is deemed directly connected to the network device when an interface on which the ARP response is received is a reference to a physical port of the network device, wherein the sender is deemed not directly connected to the network device when the interface is not a reference to any physical port of the network device;
- performing a first set of operations when the sender is deemed to be behind the network device; and
- performing a second set of operations when the sender is not deemed to be behind the network device.

16. The method of claim 15, wherein the first set of operations includes advertising a S-PMSI-AD route to other network devices in a network to which the network device belongs, wherein the second set of operations does not include advertising a S-PMSI-AD route to the other network devices in the network.

17. The method of claim 15, wherein the received packet is a multicast packet.

18. The method of claim 15, wherein the received packet is a multicast packet, wherein the first set of operations includes processing the multicast packet in addition to advertising a S-PMSI-AD route to other network devices in a network to which the network device belongs, wherein the second set of operations includes processing the multicast packet without advertising the S-PMSI-AD route to the other network devices in the network.

19. The method of claim 15, wherein the network device is a provider edge (PE) device among a plurality of PE devices in an EVPN, wherein the sender is deemed not directly connected to the network device when the sender is behind one of the other PE devices among the plurality of PE devices.

20. The method of claim 19, wherein when the sender is behind one of the other PE devices among the plurality of PE devices, the interface on which the ARP response was received refers to that other PE device.

* * * * *